United States Patent
Penick et al.

(10) Patent No.: US 8,018,324 B2
(45) Date of Patent: Sep. 13, 2011

(54) SIGHT-LINE NON CONTACT COUPLED WIRELESS TECHNOLOGY

(75) Inventors: Jerry L. Penick, Shaker Heights, OH (US); Gregg M. Sichner, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 959 days.

(21) Appl. No.: 11/534,746

(22) Filed: Sep. 25, 2006

(65) Prior Publication Data

US 2007/0229302 A1    Oct. 4, 2007

Related U.S. Application Data

(60) Provisional application No. 60/783,530, filed on Mar. 17, 2006.

(51) Int. Cl.
*H04Q 5/22* (2006.01)
(52) U.S. Cl. .................................. 340/10.5; 340/5.1
(58) Field of Classification Search .................. 340/825, 340/825.71, 825.72, 10.1, 10.5, 825.49, 725.72
See application file for complete search history.

(56) References Cited

U.S. PATENT DOCUMENTS

| | | | |
|---|---|---|---|
| 5,983,298 A * | 11/1999 | Schultz et al. | 710/302 |
| 6,154,683 A | 11/2000 | Kessler et al. | |
| 6,641,042 B1 * | 11/2003 | Pierenkemper et al. | 235/462.01 |
| 6,767,223 B2 | 7/2004 | Lostoski et al. | |
| 6,881,101 B2 | 4/2005 | Sichner et al. | |
| 6,916,194 B2 | 7/2005 | Sichner et al. | |
| 7,021,974 B2 | 4/2006 | Sichner et al. | |
| 7,080,150 B1 | 7/2006 | Wehrle et al. | |
| 7,191,019 B2 * | 3/2007 | Verstraeten | 700/2 |
| 7,295,108 B2 * | 11/2007 | Corrado et al. | 340/539.22 |
| 2005/0258939 A1 * | 11/2005 | Kantrowitz et al. | 340/10.1 |
| 2006/0197652 A1 * | 9/2006 | Hild et al. | 340/10.2 |
| 2007/0030153 A1 * | 2/2007 | Jessup | 340/572.1 |
| 2007/0052540 A1 * | 3/2007 | Hall et al. | 340/572.1 |

* cited by examiner

*Primary Examiner* — Brian Zimmerman
*Assistant Examiner* — Sara Samson
(74) *Attorney, Agent, or Firm* — Fay Sharpe LLP; R. Scott Speroff; John M. Miller

(57) ABSTRACT

Control systems and methods are disclosed for controlling operation of movable systems in an automated process with a stationary system having a first control system component and at least one movable system having a second control system component, in which optical or other non-contacting signaling between the stationary and movable systems is used to ascertain whether a movable system is proximate the stationary system, and wireless communications is used to transfer control data between the systems while the non-contacting signal link is maintained.

35 Claims, 9 Drawing Sheets

SIGHT-LINE NON CONTACT COUPLED WIRELESS TECHNOLOGY

REFERENCE TO RELATED APPLICATION

This application claims priority to and the benefit of U.S. Provisional Patent Application Ser. No. 60/783,530, filed Mar. 17, 2006, entitled SIGHT-LINE OPTICAL COUPLED WIRELESS TECHNOLOGY, the entirety of which is hereby incorporated by reference.

FIELD OF THE INVENTION

The present invention relates generally to control systems and more particularly to systems and methods for contact free control of moving systems.

BACKGROUND OF THE INVENTION

Control systems or industrial controllers are used for controlling industrial processes such as machines, manufacturing equipment, and other factory automation apparatus. Industrial controllers receive various analog and/or digital process variables or other inputs representative of the status of a controlled process and generate outputs according to a control program or routine to control the process to one or more desired setpoints or other system performance criteria. Industrial control systems are typically comprised of two or more component modules performing various functions, such as I/O modules interfacing with field devices for sending and receiving outputs and inputs, control modules that run the control program and communicate with I/O modules, etc. Inputs from the controlled process and outputs transmitted to the process, whether analog and/or digital, pass through one or more I/O modules serving as an electrical interface between the controller and the controlled process, with the control system modules typically being located in one or more interconnected racks with backplanes and/or cabling providing a common communication link or network for data transfer between modules.

Certain industrial control applications require control of one or more actions on moving systems, such as pallets moving through a series of assembly stations (also called cells or nodes) along an assembly line or path. The manufacturing pallets typically include one or more control system components for controlling various actuators, motors, etc. for implementing an assembly step at a given station. Conventional systems provided for physical connection of various apparatus to the pallets at each assembly station, such as pressurized air for operating pneumatic actuators, electrical supply power, and cabling for connecting I/O and other control components located on the moving system to control system components located at the assembly station. This physical connection and subsequent disconnection, however, is time consuming and adds cost and complexity to the manufacturing operation. Recent developments include increased usage of electrical actuators to eliminate pneumatic components and associated physical interconnections, as well as the use of wireless communications equipment including commercially available technologies such as WiFi, WLan, etc. for exchanging data between control elements of the moving system and the assembly station.

The use of wireless communications apparatus for control data transfer thus reduces the need for physical interconnection of control cables at each station. However, many industrial manufacturing sites include many assembly stations or cells located in close proximity to one another, and the pallets are often separated by only short distances as they travel along the assembly path. In this common situation, therefore, wireless communications equipment of the stations and pallets receive signals from a number of different sources at any given time, whereby each wireless entity must be assigned a unique address and identity to avoid cross talk and confusion in the overall wireless network. With respect to industrial control systems, moreover, the moving pallets typically include one or more slave components that communicate with a master control component associated with the current assembly station. The control system communications protocols often mandate that each component be assigned a unique address for wireless communications such that the master locations know what control system components are valid for control information communication, and must know who they are communicating with at any given moment. Consequently, conventional attempts at utilizing wireless communications for data transfer between industrial control system components in assembly line situations using smart pallets with on-board control elements and stationary assembly cell control components require exhaustive address assignment and management, including reconfiguration of the stationary and moving control devices when a new pallet is introduced into the system or where the system is changed to perform a different function in the manufacturing process.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The invention relates to methods and control systems for controlling the operation of movable systems such as pallets traveling along a conveyor system, robotic moving platforms traveling along a conveyance path, etc., past one or more stationary systems, such as stationary assembly stations or cells in an automated manufacturing facility. The stationary and movable systems are each equipped with one or more control system components, such as control modules, I/O modules, etc., as well as wireless communications devices such that the control component(s) of the stationary system can communicate with control components of the movable systems without physical connection thereto. In addition, non-contacting signaling means are provided, for example, optical signal transmitters and receivers, magnetic signaling components, etc., for transmission of a non-contacting signal in a signal path near the stationary system. Wireless communications between the stationary and mobile control system components is then selectively performed based on the status of the non-contacting signal link. By this arrangement, the present invention can be successfully employed to ensure that the wireless link is utilized for control data transfer only when the movable system is proximate to the stationary system, for instance, when a mobile pallet or robot is in a given assembly station. When the non-contacting signal link is broken (e.g., when the pallet moves away from the assembly station), the wireless communication is discontinued.

This novel approach is thus an improvement over the above mentioned conventional systems in which control system cabling had to be physically connected between components of the mobile pallets and the assembly stations, and further provides a significant advance over prior wireless configurations that required control components of the mobile systems to be assigned a unique address for communications purposes. By the present invention, the mobile systems need not have unique addresses, whereby the cost and complexity of configuration and reconfiguration of control system components can be mitigated when the automated process changes, or when pallets are added to or removed from the system. In this respect, the invention employs wireless transport of control-related information but does not require the wireless nodes of the moving systems to have any wireless address or identity, while also avoiding physical connections between stationary and moving systems in automated industrial control applications. At the same time, the invention addresses wireless cross-talk problems with verification and communication security being provided using optical, magnetic, or other non-contacting signaling that can be modulated in certain embodiments so as to confirm that control components associated with a given assembly station are communicating with control devices of the movable system currently at that station.

In accordance with one or more aspects of the invention, a control system is provided for controlling operation of a movable system. The control system comprises a wireless communications component associated with a stationary system, along with a non-contacting signaling component associated with the stationary system which is operative to transmit or receive a signal in a signal path proximate the stationary system. A control system component associated with the stationary system is operatively coupled with the non-contacting signaling component and with the wireless communications component. The control system component uses the non-contacting signaling system to verify whether the movable system is proximate the stationary system, and uses the wireless communications component to communicate with one or more control system components associated with a particular movable system while the particular movable system is proximate the stationary system. Any type of non-contacting signal or signals may be used to determine whether the movable system is close to the stationary system, such as optical signals, magnetic signals, or any other signal form that can be transmitted along a defined signal path to allow transmission and receipt when a given movable system is within a desired location and which prevents signal transmission and receipt otherwise. The non-contacting signal, moreover, may be modulated in certain preferred embodiments, and such modulated signal can include an identifier unique to a particular stationary or movable system, thereby facilitating verification that a movable system is proximate the stationary system based on responsive wireless acknowledgment or handshaking communications that include the identifier. In some embodiments, the non-contacting signal is generated by the stationary system, and in others, the mobile system can transmit the optical, magnetic, or other non-contacting signal. In addition, the control system component of the stationary system may use the wireless communications to assign an identifier to a particular movable system while the non-contacting signaling link is established, and the movable system may be operative to provide a previously assigned identifier to a stationary system, to thereby facilitate further system-wide adaptability to different manufacturing goals and strategies.

Further aspects of the invention relate to a movable system for performing one or more controlled operations while proximate a stationary system. The movable system includes a wireless communications component, a non-contacting signaling component, and a control system component that uses the non-contacting signaling system to verify whether the movable system is proximate a particular stationary system. The wireless communications component is used to communicate with another control system component associated with the stationary system while the movable system is proximate the particular stationary system. In one embodiment, the non-contacting signaling component is a receiver operative to receive a signal from the signal path while the movable system is proximate the particular stationary system, and the signal can be an optical signal, a magnetic signal, or other non-contacting signal type, which may be modulated. The movable system, moreover, can preferably receive an identifier from the particular stationary system by wireless communications and may provide a previously assigned identifier to the particular stationary system by wireless communications while the particular movable system is proximate the stationary system.

In accordance with other aspects of the invention, methods are provided for controlling at least one operation of a movable system that is proximate a stationary system. The method comprises determining whether the movable system is currently proximate the stationary system using non-contacting signaling apparatus on the stationary and movable systems, transferring control information between the stationary and movable systems by wireless communications while the movable system is determined to be proximate the stationary system, and discontinuing transfer of control information between the stationary and movable systems when the movable system is determined to be no longer proximate the stationary system. In certain embodiments, the determination of whether the movable system is currently proximate the stationary system comprises transmitting an optical signal by a first one of the stationary system and the movable system, and determining that the movable system is currently proximate the stationary system is the optical signal is successfully received by a second one of the stationary system and the movable system. The methods may also include assigning an identifier to the movable system and providing a previously assigned identifier to the stationary system by wireless communications while the movable system is determined to be proximate the stationary system.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention are set forth in the following detailed description of the invention when considered in conjunction with the drawings, in which.

DETAILED DESCRIPTION OF THE INVENTION

Figure 1:
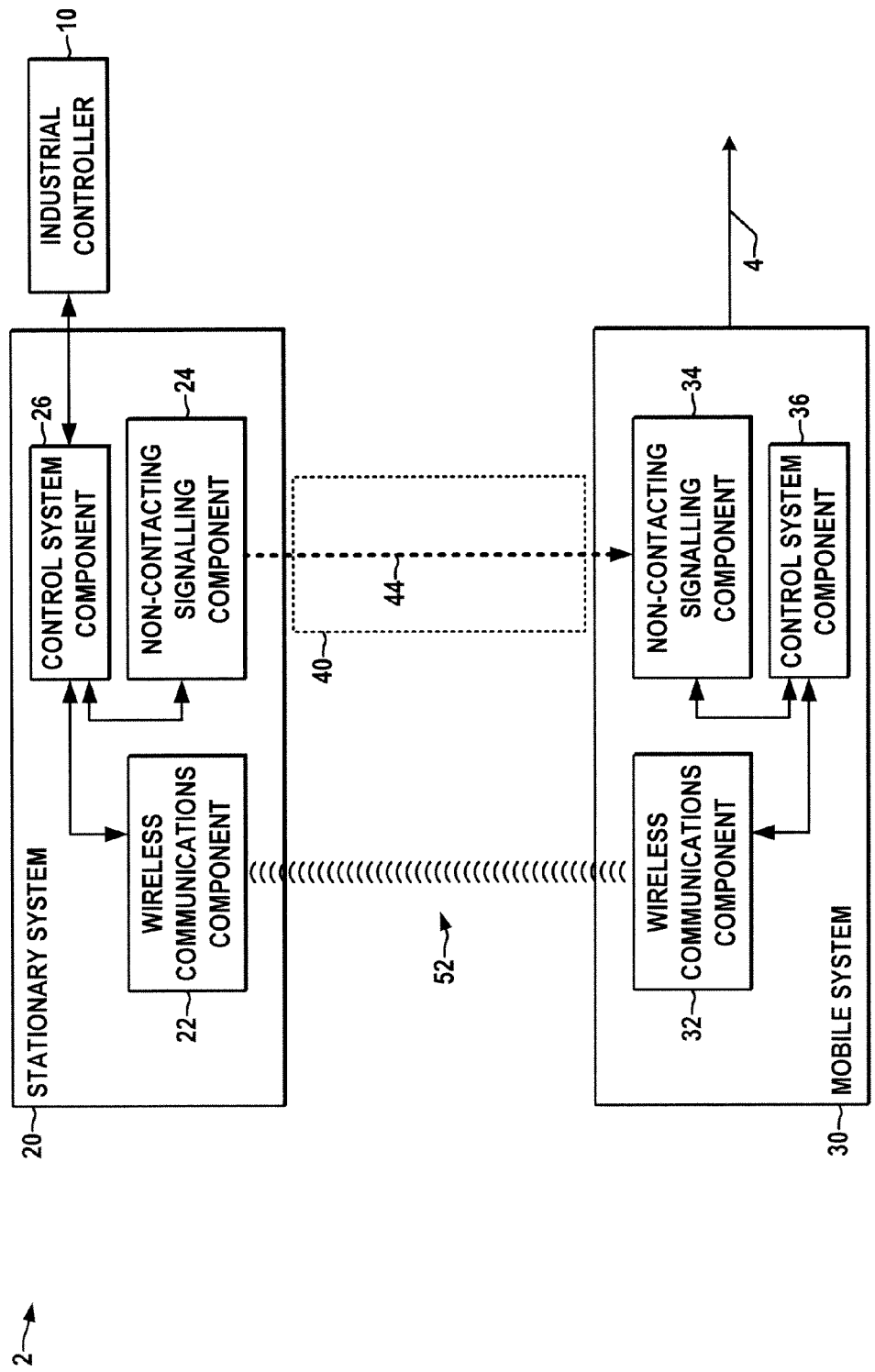
FIG. 1 is a simplified system diagram illustrating an automated industrial control system with a stationary system operative to perform wireless communications with one or more mobile systems using a non-contacting signaling component to verify that a particular mobile system is proximate the stationary system.

Referring now to the figures, several embodiments or implementations of the present invention are hereinafter described in conjunction with the drawings, wherein like reference numerals are used to refer to like elements throughout, and wherein the various features are not necessarily drawn to scale. The invention provides methods and systems for control of movable systems in an automated process with a stationary system having a first control system component and a movable system having a second control system component, in which non-contacting signaling between the stationary and movable systems is used to ascertain whether the movable system is proximate the stationary system, and wireless communications is used to transfer control data between the systems while the non-contacting signal link is maintained. In the following examples, different forms of stationary and movable systems are illustrated and described, including stationary equipment associated with a manufacturing assembly station (e.g., assembly cell, assembly node, etc.), and moving pallets, whether self-propelled units or structures traveling along a conveyor system, wherein the stationary and moving systems each include at least one control system component, which may be a standalone controller, one or more modules of an industrial control system, or any other form of components or device that forms a part of a control system, including but not limited to control elements and/or I/O elements. In general, the various aspects of the invention facilitate communication between such control devices on or operatively associated with stationary and moving systems using wireless communications (e.g., radio frequency or RF), together with not-contacting signaling devices and techniques used for verification that a particular movable system is proximate a given stationery system. In this regard, while certain forms of non-contacting signaling are illustrated and described in the embodiments below, any form of non-contacting signaling may be employed in a given the implementation of the various aspects of the invention, including but not limited to infrared or other optical signaling means, magnetic signaling means, etc., which do not require a physical connection between a stationary and a movable system.

FIG. 1 illustrates various aspects of the invention in simplified form for an automated industrial control system 2 that includes the stationary system 20 operatively coupled with an industrial controller 10, along with one or more mobile systems 30 traveling along the conveyance path 4. Both the stationary system 20 and the mobile system 30 include one or more control system components 26, 36, such as control modules, I/O modules, etc., along with wireless communications components 22, 32, and non-contacting signaling components 24, 34. With respect to the stationary system 20, the control system may be employed for controlling one or more operations of the movable system 30, for instance, one or more manufacturing, assembly, testing, or other processing steps relative to a part or workpiece transported by the movable system 30 using one or more control system components 36 to control, monitor, relay input or output information to or from one or more actuators such as motors, solenoids, etc., located on or otherwise associated with the mobile system 30. For example, the mobile system 30 may include positioning actuators or elements that are operable to control the relative location of a workpiece transported by the mobile system 30, wherein the control system component 36 may receive control information from the component 26 associated with a particular stationary system 20 and accordingly will control the positioning apparatus in order to move such a workpiece to a given location for performance of one or more assembly steps, whether automated, manual, or combinations thereof, not an idle system 30 is proximate the stationary system 20. In this regard, one, some, or all, of the control system components 25, 36 may be configured as logical "masters" or "slaves".

The control system comprises a first wireless communications component 22 associated with the stationary system 20, and a non-contacting signaling component 24 also associated with the stationary system 20. The signaling component 24 can be of any type that operates to send a signal 44 or receive a signal 44 to or from the signal path 40 without requiring any physical connection between the systems 20 and 30, where the path 40 is proximate to the stationary system 20. In the illustrated embodiments, moreover, the signaling component 24 of the stationary system 20 is a transmitter operative to send or transmit the non-contacting signal 44 within the signal path 40. Other embodiments are possible, wherein the non-contacting signaling component 24 of the stationary system 20 is a receiver that operates to receive a non-contacting (e.g., optical, magnetic) signal 44 from the path 40, or a transceiver operative for bi-directional non-contacting signaling.

The system also includes a first control system component 26 associated with the stationary system 20 that is operatively coupled with the non-contacting signaling component 24 and with the wireless communications component 22 using any suitable communicative and/or signal coupling. The control system component 26 of the stationary system 20 uses the non-contacting signaling system 24 to verify whether a movable system 30 is proximate the stationary system 20. In this implementation, the mobile system 30 is deemed to be proximate the stationary system 20 when the signaling components 24, 34 are able to successfully send/receive a non-contacting signal 44 via the path 40. The component 26 of the stationary system 20, then uses the wireless communications component 22 to communicate with the control system component 36 associated with the movable system 30 while the movable system 30 remains proximate the stationary system 20 (e.g., while the non-contacting the signal-link is maintained). In this manner, the wireless communications 52 via the components 22, 32 is undertaken only while the mobile system 30 is within a fixed range of positions relative to the stationary system 20. This novel arrangement, therefore, facilitates wireless communication of control information or data between the systems 20, 30 and the control system components 26, 36 thereof without requiring assignment or configuration of specific wireless addresses for the components of 26, 36. As a result, the invention provides a significant advancement over prior wireless solutions with respect to ease of adaptation of the system 2 to changing requirements, such as insertion of new movable systems 30 into an automated process, changing operations to be performed at a given station 20, etc.

Figure 2:
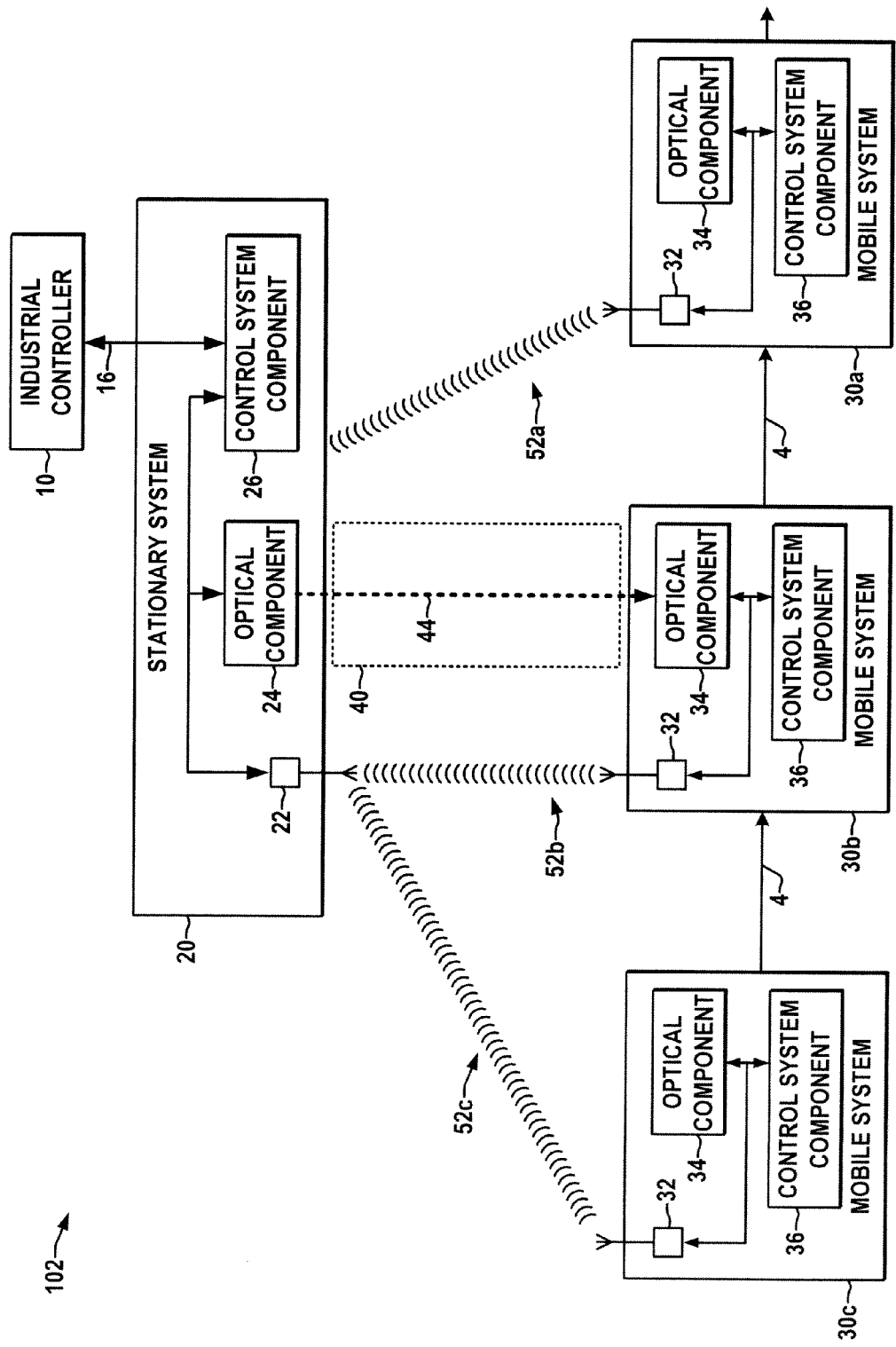
FIG. 2 is a system diagram illustrating another exemplary factory automation system having a stationary system with optical and wireless components for selectively performing wireless communications with a given one of a plurality of mobile systems traveling along a conveyance path, using optical signaling means for determining whether the given mobile system is proximate the stationary system.
Figure 3:
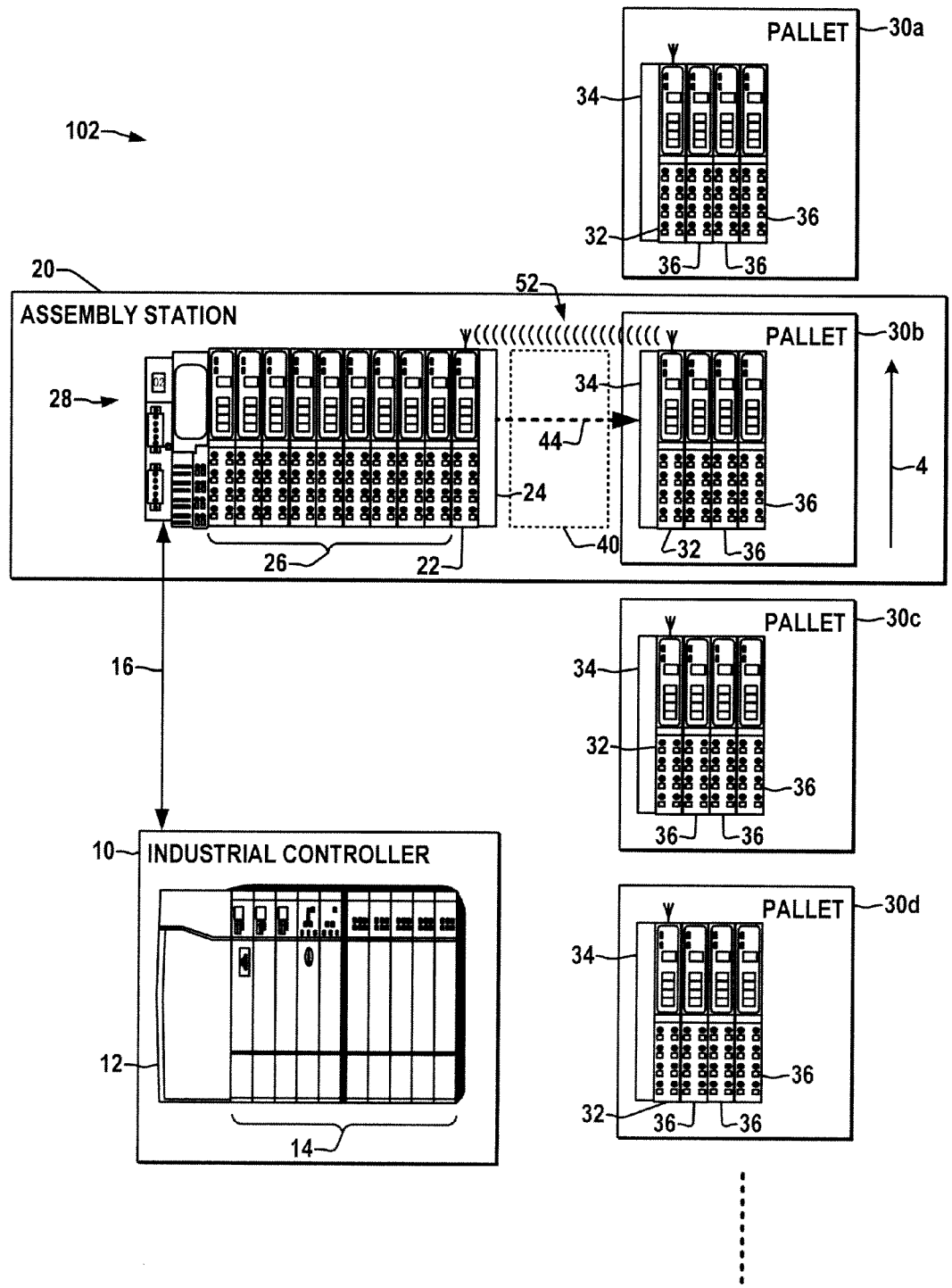
FIG. 3 is a system diagram illustrating further details of the automation system of FIG. 2, in which a stationary assembly station includes various components of a modular industrial control system with a wireless interface for communications with control system components associated with one of a plurality of moving pallets, along with optical signaling components for verifying that a particular panel it is within the assembly station.

Referring now to FIGS. 2 and 3, an exemplary automated system or plant 102 is shown, including a plurality of movable pallets 30 that hold or support components being assembled, wherein a series of several pallets 30a, 30b, 30c, and 30d is shown for illustrative purposes traveling along a conveyance path 4. These moveable systems 30 follow the path or line 4 and are sequentially received at various assembly stations 20, one of which is shown in FIGS. 2 and 3. In general, the factory automation system 102 may include any number of such stationary systems 20, and may include one or more conveyor paths 4 so as to implement a desired manufacturing or assembly process or multiple processes. In this regard, different operations can be undertaken at a given assembly station 20 and individual movable pallet systems 30 may be conveyed or directed to different stations 20 depending on a given mix of products being manufactured in the plant 102, as illustrated and described in greater detail hereinafter with respect to FIG. 9. In the embodiment of FIGS. 2 and 3, each assembly station 20 includes a wireless master control system component 26 that may, but need not be, coupled by wireless or wired network 16 to an industrial controller 10, in this example, a modular controller 10 with a rack 12 housing several control modules 14. The illustrated stationary control system component 26 in one implementation can be an I/O network adapter connected via hard-wired cabling 16 to the industrial controller 10 that may itself include control and/or I/O elements implementing a control program.

Each movable pallet 30 includes a slave control system component 36, such as one or more I/O modules connected to a backplane on the pallet 30 and to a wireless transceiver 32 for wireless exchange of I/O data with the master component 26 of the stationary system 20. Although this example includes different control system components 26 and 36 configured as master and slave for communications purposes, this arrangement is not a requirement of the invention, and the control system elements or components 36, 36 of the stationary and movable system 20, 30 can be of any type. In the example of FIGS. 2 and 3, moreover, each movable pallet 30 includes a slave control system component 36 that forms an operative pair with the stationary master component 26 when linked by the wireless means 22, 32. In order to ensure that each master component 26 is communicating with only the correct slave component 36 (the one associated with the pallet 30 currently in the assembly station 20), the master and slave components 26, 36 first establish and then continuously maintain a non-contacting (e.g., optical or magnetic) signal link or loop via the non-contacting signaling components 24, 34, where the establishment of the signal link is used as a logical enable or gating control for the wireless control data transfer. The wireless data transfer is preferably a radio-frequency (RF) data transfer, and the non-contacting signal loop in an optical signaling implementation can utilize a modulated laser or LED or other suitable light source, including but not limited to infrared wavelengths. In other possible implementations, magnetic signaling components 24, 34 can be employed. As shown in FIG. 2, this allows the stationary system 20 to communicate exclusively with the adjacent pallet 30b via wireless communications 52b while ignoring any communications 52a, 52c from other (non-proximate) pallets 30a and 30c.

Referring particularly to FIG. 3, in one possible embodiment, the master component 26 is provided as a first part (e.g., module) coupled with a POINTbus backplane sold by the assignee of the present invention, which is operatively associated with the stationary system 20 and may be connected by wireline or wireless network 16 to other control systems 10. In this example, the POINTbus backplane can be interrupted and then can reconnect (repair) itself with ease implementing Removal and Insertion Under Power (RIUP) functionality for connecting and disconnecting control modules 26 from the communications link provided by the backplane and any wireless extensions thereof provided by the wireless communications components 32. As best shown in FIG. 3, the stationary assembly system 20 includes a rack 28 with a backplane (not shown) providing communicative connection and powering of various control modules (control system components) 26 including a wireless transceiver equipped module 22, where the control modules 26 are also operatively coupled with an optical transmitter/receiver 24 that generates modulated optical signals 44 along the optical signal path 40 proximate the station 20.

Similarly, the movable pallets 30 in this example include one or more control system component modules 36 (e.g., I/O modules and/or control modules) with one module 32 being wireless equipped, where the control components 36 are operatively coupled with an optical transceiver 34 for receiving/sending optical signals in the path 40. The wireless extension and RIUP capabilities in the illustrated system 102 allow the POINTbus backplane to be operatively split or segmented into a first part comprising a network communications adapter and any other desired modules 26 with a wireless (e.g., RF) master transceiver 22, as well as one or more second parts (on the movable systems 30), each of which include one or more input/output modules 36 and a slave wireless (e.g., RF) transceiver 32, wherein any one of the second parts completes the POINTbus backplane when the associated wireless slave transceiver 32 thereof is wirelessly linked by RF to the wireless master transceiver 22. In the system 102, moreover, the stationary and mobile systems 20, 30 also include the above-described optical link means for sending and receiving the optical signal 44. In this manner, the POINTbus backplane is completed and functions for input/output operations only when the wireless slave transceiver 32 of a particular one of the mobile "second parts" is also optically linked to the wireless master transceiver 22 by the non-contacting signaling means 24, 34.

In this manner, the wireless signals sent from any of the "second parts" that are not also optically linked with the wireless master control component 26 are ignored by the stationary system 20 and also by the other wireless slave components 36. Moreover, the exemplary embodiments do not require definition and management of any node addresses, and therefore are particularly advantageous in industrial control applications involving large numbers of assembly stations 20 and moving systems 30 and/or in applications in which the system is changed. For example, in the case of an automotive transfer line, wireless communications addresses for hundreds of movable pallets or self-propelled robots would have to be defined and managed, including at least one node address for each assembly cell or station 20 that performs or controls operations on a movable system 30 or a workpiece conveyed thereby. In the various implementations of the invention, on the other hand, the stationary masters do not have to manage lists of slaves and perform complex analysis to decide which one to operate on or communicate with based on physical detection, bar code, RFID, etc. Thus, the invention allows the slaves 36 to be managed as anonymous nodes without such addresses. Moreover, the systems and methods of the current invention are applicable to systems 102 in which the pallets or movable systems 30 stop at each station 20, as well as to implementations such as conveyor lines in which the pallets 30 are continually moving along the path 4 past the assembly stations 20. These novel systems and methods thus merge the flexibility and bandwidth of wireless technology together with the positive identification of a modulated laser or LED light source or other non-contacting signaling means to provide communication confirmation by connectionless signaling.

Figure 4:
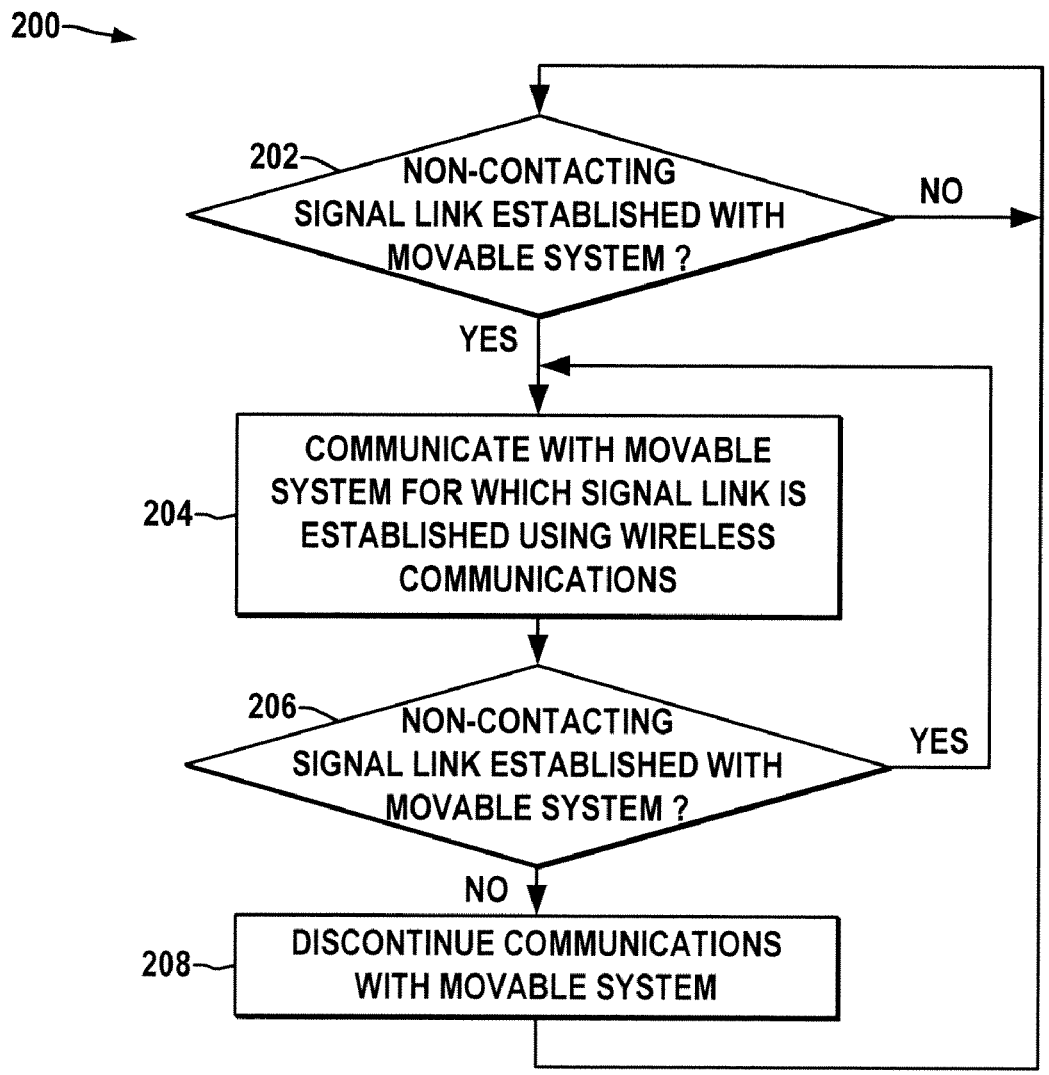
FIG. 4 is a flow diagram list rating exemplary operation of the stationary system of FIGS. 2 and 3 for optically verifying the presence of a movable system proximate the stationary system, and then communicating with the movable system using wireless communications while the non-contacting optical signal link is maintained.
Figure 5:
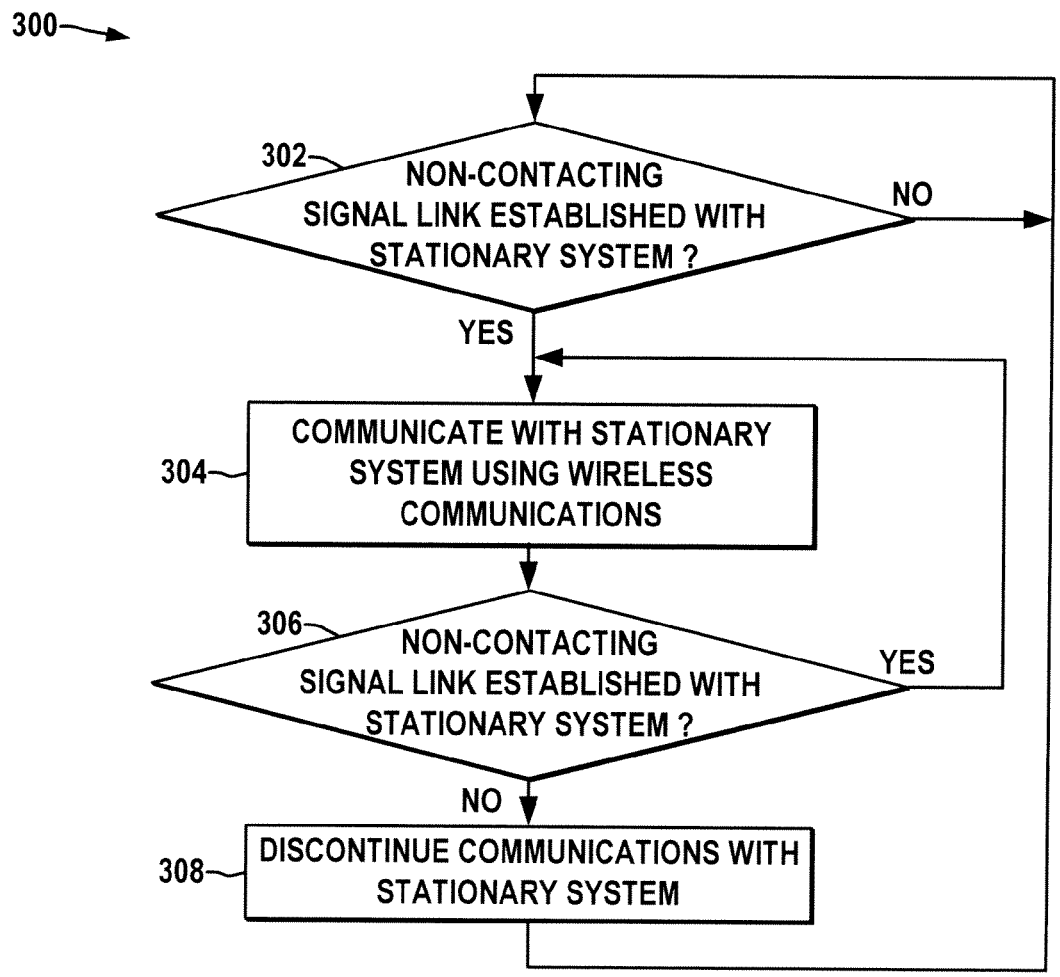
FIG. 5 is a flow diagram illustrating exemplary operation of the movable system of FIGS. 2 and 3 for wireless communication with the stationary system while the non-contacting signaling link is maintained.
Figure 6:
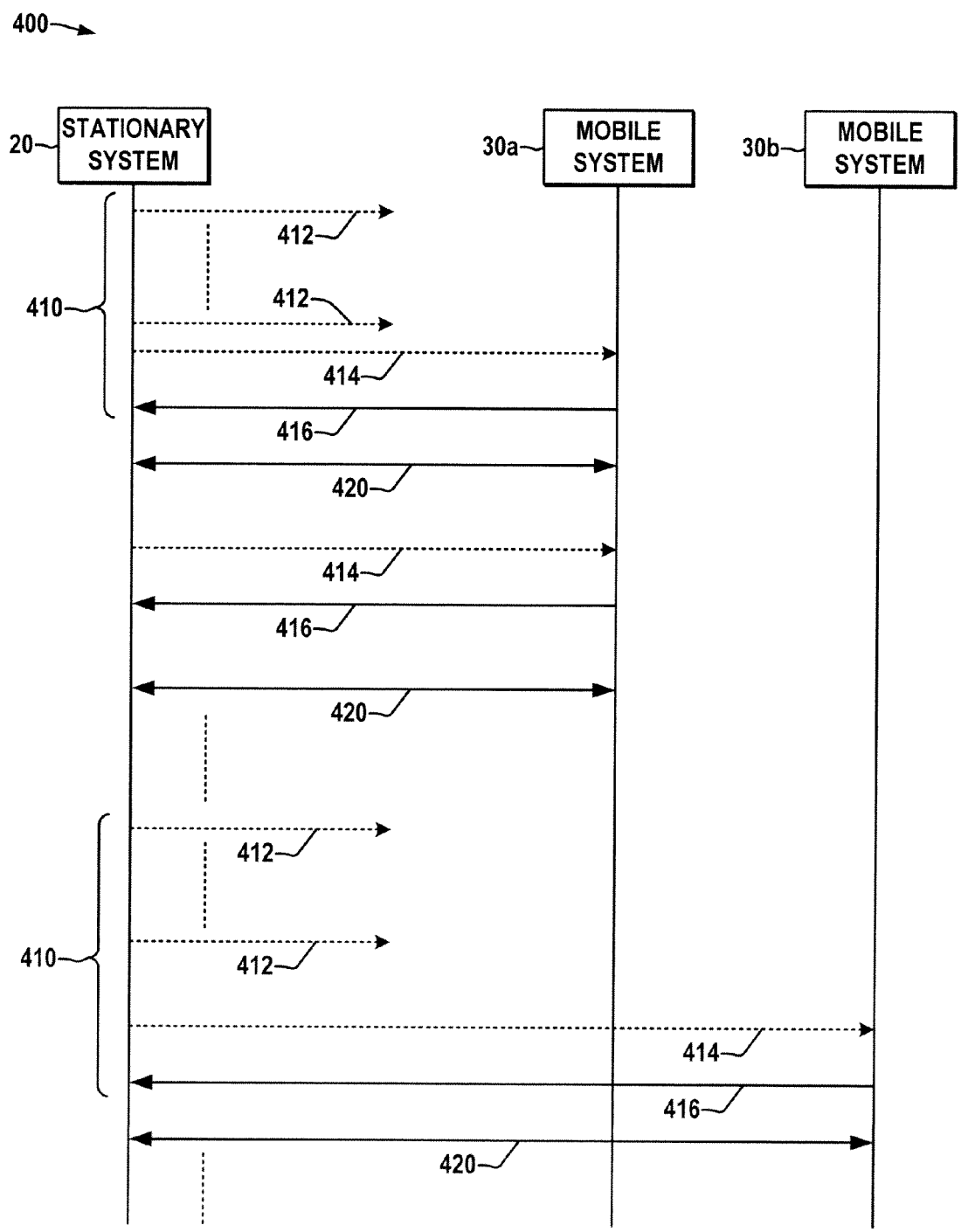
FIG. 6 is a signal flow diagram illustrating selective communication by the stationary system of FIGS. 2 and 3 with a select one of a plurality of mobile systems, including optical signal link verification of the proximity of a given mobile system as well as wireless communication for transferring control data between the stationery system and the given mobile system.

Referring also to FIGS. 4-6, the functionality of the master and slave communications can be implemented in a variety of ways by which a control component 26 employs the non-contacting signaling system 24 to verify whether a movable system 30 is proximate the stationary system 20 and uses the wireless communications component 22 to communicate with a second control system component 36 associated with a particular movable system 30 while the movable system 30 is proximate the stationary system 20. FIG. 4 depicts a flow diagram 200 illustrating one possible form of operation for the stationary system 20 and FIG. 5 shows a flow diagram 300 illustrating a corresponding example of the slave or movable system operation in the above described system 102. In this implementation, the wireless communications between a wireless master 26 and slave 36 is initiated using an optical recognition step, and this is responded to via wireless transmission 52, although the invention is not limited to this exemplary embodiment or any particular handshaking or acknowledgment approach or protocol. The resulting wireless communications in the illustrated embodiments continues as long as the optical beam 44 is within the desired range and position (e.g., as long as the moving optical component 34 receives the signal 44 from the optical signal path 40). Once the optical connection or link is broken, the wireless data communication 52 therebetween is terminated. This novel technology facilitates connectionless management of an entire industrial process in which a plurality of stationary systems 20 can share multiple different portable wireless slave nodes 30 without any preset identity address or mechanism, without any undue burden or reconfiguration for the addition or deletion of portable wireless slave nodes 30 or the rerouting of the manufacturing process between stationary nodes 20.

As shown in the flow diagram 200 of FIG. 4, the stationary system 20 (e.g., the control component 26 thereof) begins at 202 by assessing whether a non-contacting signal link has been established with a movable system 30. If not (NO at 202), the non-contacting signal link test is repeated at 202 until a link has been created or verified (YES at 202). In one example, the movable system 30 receives the signal 44 and either initiates a wireless message to the master 20 indicating receipt of the signal 44 (possibly including an identifier provided in a modulated non-contacting signal 44), or responds to a periodic polling message from the stationary system 30. At that point, the master 20 and slave 30 may perform any suitable handshaking via the wireless communications link 52 and/or the optical link, which may thereafter be repeated periodically or aperiodically, to provide a continuing indication of whether the optical link is currently maintained at any given time. With the optical link successfully initiated, the process 200 proceeds to 204 with the stationary master system 20 communicating wirelessly with the particular movable slave system 30 for which the optical link is established. The veracity of the optical link is rechecked at 206, and if still maintained or established (YES at 206), the communications continues at 204. This communications process continues at 204 and 206 until a determination is made at 206 that the non-contacting signal link has been broken (NO at 206), at which time the wireless communications is discontinued at 208, and the stationary system 20 returns to 202 to wait for establishment of another (or re-establishment of the most recent) non-contacting link.

The flow diagram 300 of FIG. 5 shows exemplary operation of the mobile system 30, with the mobile system 30 determining at 302 whether a non-contacting link has been established. If so (YES at 302), the process 300 proceeds to 304 where the movable system 30 communicates with the local stationary system 20, with the veracity of the non-contacting link being again verified at 306. If the signal link remains established (YES at 306), the communications continues at 304, and if not (NO at 306), the wireless communications is discontinued at 308, and the movable system 30 returns to 302 to wait for establishment of another non-contacting link (e.g., when it arrives at the next assembly station 20).

FIG. 6 illustrates a signal flow diagram 400 showing the wireless communication and non-contacting signal exchange between the stationary system 20 and the moving systems 30 in the example of FIGS. 2 and 3 to illustrate the sequential temporary establishment of communications between a given assembly station 20 and multiple moving systems 30 traveling past the station 20, including optical signal link verification 410 of the proximity of each individual mobile system 30, along with wireless communication 420 for transferring control data between the stationery system 20 and the given mobile system 30 until the moving system moves 30 out of the assembly station 20 (out of the effective range of the non-contacting signal 44).

The process 400 begins with optical signal link verification at 410, including the stationary system 20 sending one or more unanswered probe signals 412. Once a particular movable system 30 enters the station 20, the next optical probe signal 414 is received by a first mobile system 30a, which then responds with one or more handshaking messages 416 via wireless communications, where the handshaking in certain embodiments may involve the first movable system 30a sending back an identifier that was included in the received non-contacting signal probe 414. Thereafter, one or two-way wireless communications 420 is undertaken, with one or more subsequent non-contacting signal probes 414 being sent, and if received and properly acknowledged by wireless signal(s) 416, the communications 420 continues until at least one non-contacting signal probe 412 is unanswered, thereby indicating that the movable system 30a is no longer proximate the stationary system 20. At this point, the wireless communications 420 is discontinued and the stationary system 20 again enters the non-contacting signaling verification operating mode 410 to await the arrival of another movable system 30 (e.g., or the return of the first system 30a). Similar processing occurs once the next movable pallet 30b is within the non-contacting signal path 40, whereupon a probe 414 is received and answered at 416 by the second moving system 30b, after which communications 420 is undertaken between the stationary system 20 and the current movable system 30b.

Figure 7:
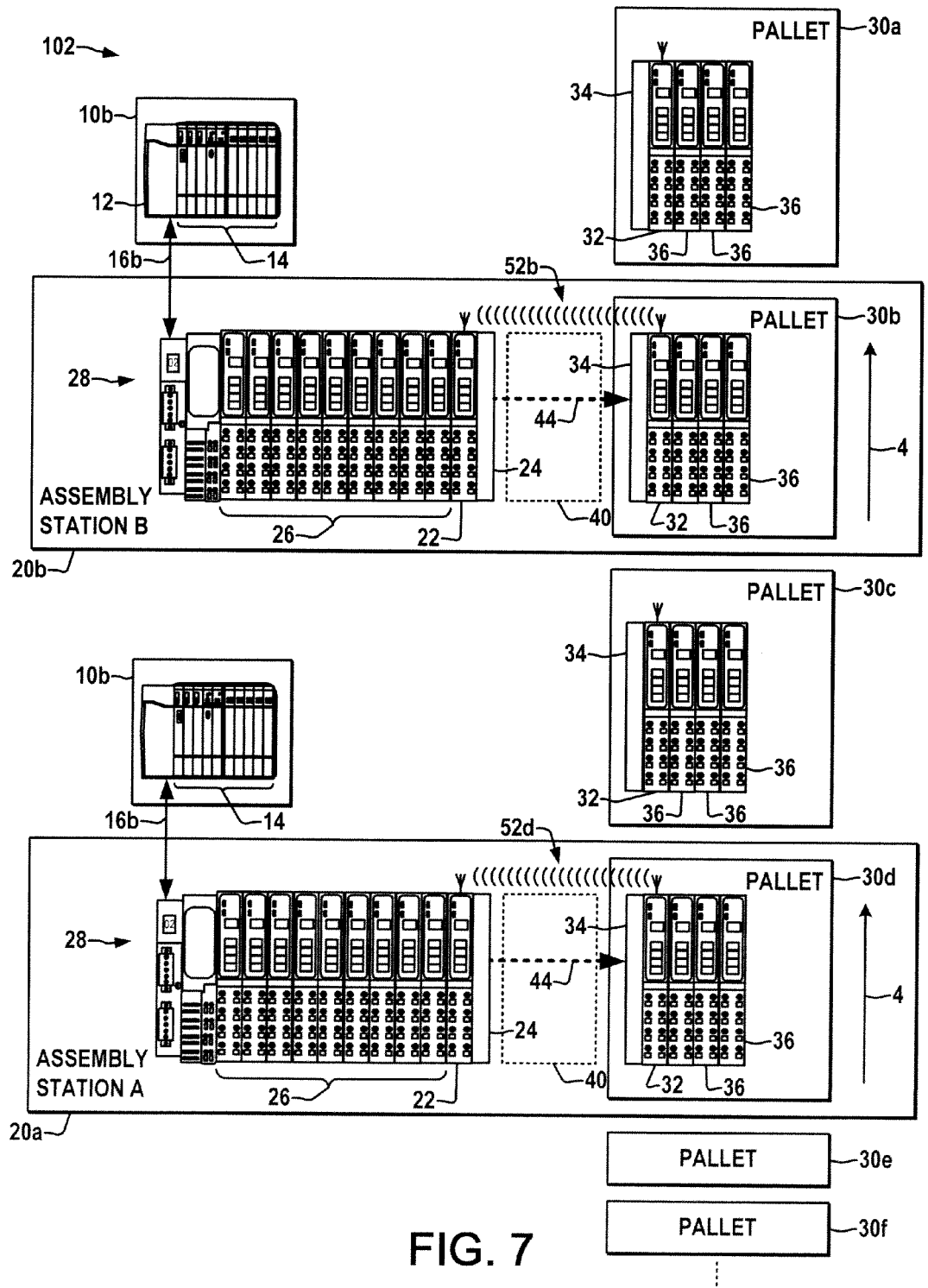
FIG. 7 is a system diagram further illustrating the automation system of FIGS. 2 and 3, including two assembly stations positioned along the travel path with a plurality of movable pallets proceeding along the path, wherein each assembly station performs wireless communications with a particular pallet that is proximate the assembly station using optical signaling verification to ensure that the wireless communication is with the pallet currently in the assembly station.
Figure 8:
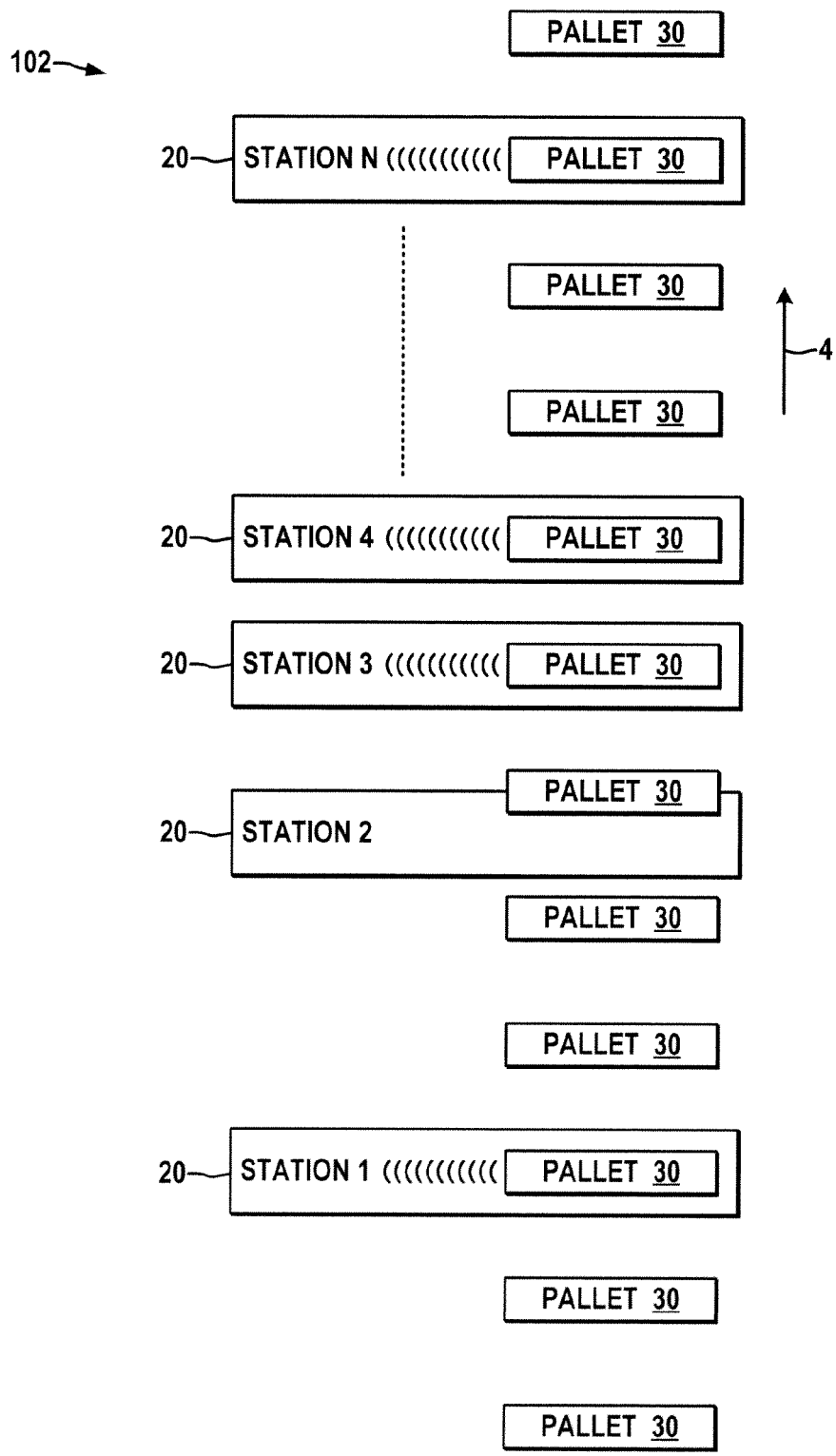
FIG. 8 is a simplified system diagram further illustrating the automation system of FIGS. 2, 3, and 7, in which an integer number N assembly stations are positioned along the conveyance path, with the series of movable pallets traveling along the path and selective wireless communications between the assembly stations and individual pallets as they move past a given station.

Referring now to FIGS. 7 and 8, the system 102 can include any number of stationary systems 20 and movable systems 30, where FIG. 7 shows a portion of the described automated system 102 including two assembly stations 20a and 20b positioned sequentially along the conveyance path 4 to independently service pallets 30 as they travel along the line for performance of one or more assembly operations at the stations 20. As shown in FIG. 7, each assembly station 20 performs wireless communications 52 with a particular pallet 30 that is currently proximate the station 20 using optical non-contacting signaling verification 44 to ensure that the wireless communication 52 is with the pallet 30 currently in (proximate to) the assembly station 20. In the situation illustrated in FIG. 7, pallets 30a-3f are shown traveling along the path direction 4, with pallet 30d currently in the first assembly station 20a and pallet 30b currently in the second station 20b, with corresponding wireless communication 52b and 52d occurring, respectively. This concept can be extended to any desired level for a given automation system 102, as further shown in FIG. 8 where an integer number N assembly stations 20 are positioned along the conveyance path 4, with the series of movable pallets 30 traveling thereon, with selective wireless communications being undertaken at any given point in time between the assembly stations 20 and individual pallets 30 as they move past a given station 20.

Figure 9:
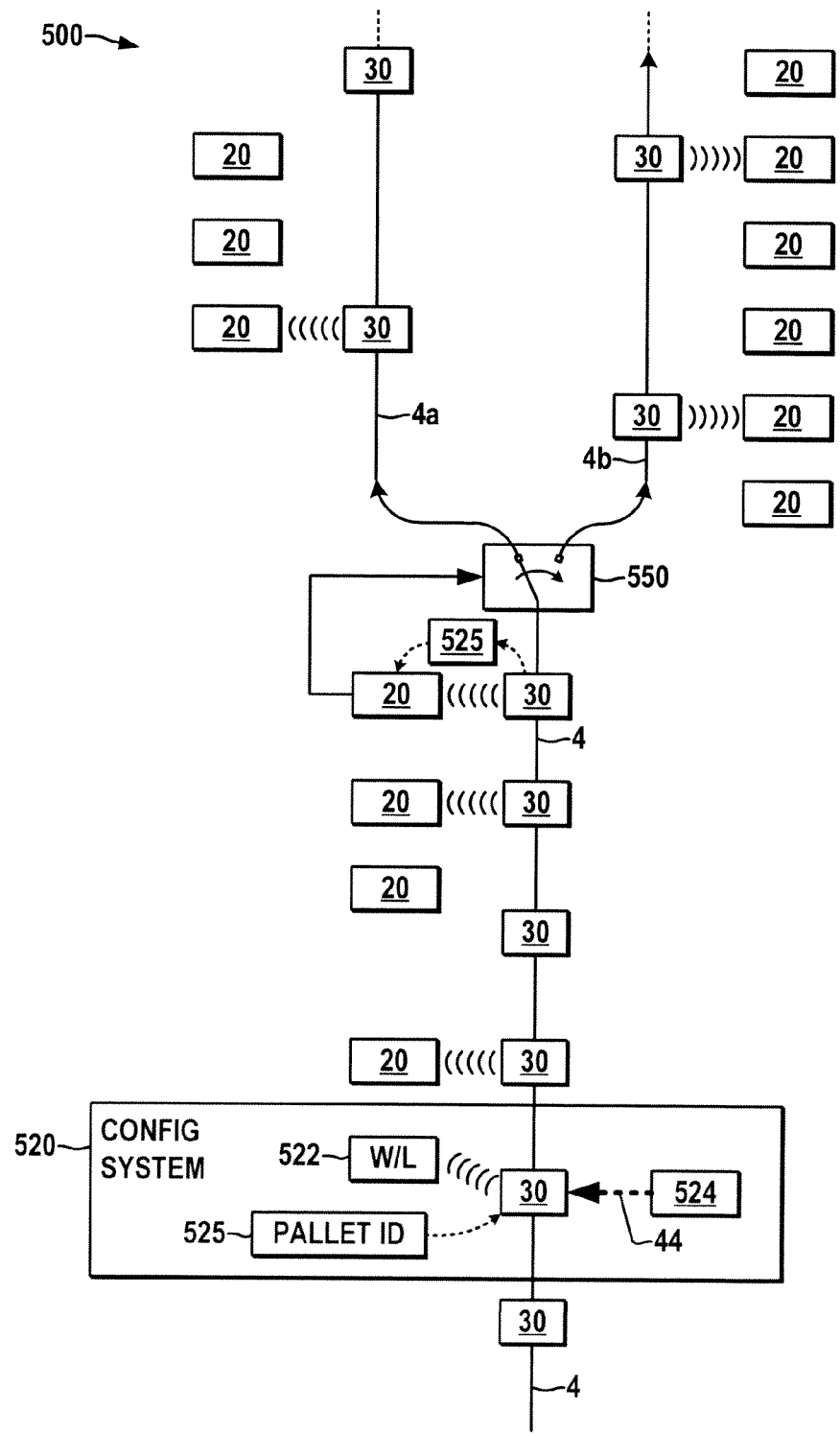
FIG. 9 is a simplified system diagram illustrating another exemplary automation system having a configuration system station in which pallets moving along a first portion of a travel path are provided with a palette identifier using wireless communications, and in which a second stationary system receives the previously assigned identifier from the pallets via wireless communications and uses the identifier to selectively direct individual pellets along one of two subsequent portions of the conveyance path.

FIG. 9 illustrates another exemplary automation system 500 having a configuration system station 520, which is configured similar to the above described stationary systems 20. In this system 500, pallets 30 move along a first portion of a travel path 4 and are provided with a palette identifier 525 at the configuration system station 520 using wireless communications via a wireless component 522 associated with the station 520, enabled by the above described non-contacting type signaling to ensure the wireless communications occurs only when the pallet 30 is proximate the station 520. In this regard, it is noted that the identifier 525 can be a product code, or any other identifier that indicates to one or more subsequent assembly stations 20 a particular characteristic associated with, or desired operation to be performed relative to, the pallet 30 or a product or workpiece being transported thereby. For example, the configuration system 525 may receive product specification information from another controller or another system through a network or other means (not shown), indicating that a first number of blue products are to be manufactured and that a second number of red units are to be built. The system 525 can then provide a first identifier (indicating "blue" product processing) to certain pallets and another different identifier to other pallets (indicating "red"), so that the desired number of each product color are manufactured. In this regard, the identifier need not be unique, and need not be managed as would a wireless communications address. In the system 500 of FIG. 9, moreover, a subsequent assembly station 20 obtains the previously assigned identifier 525 from the pallet 30 as it enters the station 20, and this information is used to control a conveyance routing switch 550 such that pallets 30 identified as "red" are directed along one secondary path 4a while "blue" pallets 30 are sent along a different secondary path 4b. In this manner, the pallets 30 may be assigned temporary identifiers 525 for all or certain portions of an overall manufacturing process, where the identifiers 525 can be assigned based on a global manufacturing strategy implemented through various control systems, and the individual pallets 30 are reusable for any given path 4 through the manufacturing facility 500. In other possible implementations, the assigned identifier 525 can be used by one or more of the local assembly stations 20 to selectively undertake certain actions for workpieces traveling on certain pallets 30, depending on the assigned identifier 525, alone or in combination with selective conveyance path routing changes based on assigned identifiers 525.

The above implementations are merely examples of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A control system for controlling operation of a movable system, the control system comprising:
    a wireless communications component associated with a stationary system;
    a non-contacting signaling component associated with the stationary system and operative to transmit or receive a signal in a signal path proximate the stationary system;
    a control system component associated with the stationary system and operatively coupled with the non-contacting signaling component and with the wireless communications component, the control system component using the non-contacting signaling system to verify whether a movable system is proximate the stationary system and using the wireless communications component to provide control information to a second control system component associated with a particular movable system to control at least one positioning actuator of the particular movable system to control a position of a workpiece transported by the particular movable system while the particular movable system is proximate the stationary system; and wherein the moveable system is a robotic moving platform.

2. The control system of claim 1, wherein the signal is an optical signal.

3. The control system of claim 2, wherein the non-contacting signaling component comprises an optical transmitter operative to transmit the optical signal in the signal path proximate the stationary system.

4. The control signal of claim 3, wherein the optical signal is modulated by the optical transmitter to include an identifier unique to the stationary system and wherein the control system component verifies that the particular movable system is proximate the stationary system based on wireless communications from the particular movable system that includes the identifier.

5. The control system of claim 1, wherein the non-contacting signaling component comprises a transmitter operative to transmit the signal in the signal path proximate the stationary system.

6. The control signal of claim 5, wherein the signal is modulated by the transmitter.

7. The control system of claim 1, wherein the non-contacting signaling component comprises a receiver operative to receive the signal in the signal path from a movable system proximate the stationary system.

8. The control system of claim 1, wherein the control system component is operative to assign an identifier to the particular movable system by wireless communications while the particular movable system is proximate the stationary system.

9. The control system of claim 8, wherein the particular movable system is operative to provide a previously assigned identifier to the control system component by wireless communications while the particular movable system is proximate the stationary system.

10. The control system of claim 1, wherein the particular movable system is operative to provide an identifier to the control system component by wireless communications while the particular movable system is proximate the stationary system.

11. A movable system for performing at least one controlled operation while proximate a stationary system, comprising:
    a wireless communications component;
    a non-contacting signaling component associated with the movable system and operative to transmit or receive a signal in a signal path proximate a particular stationary system while the movable system is proximate the particular stationary system;
    a control system component associated with the movable system and operatively coupled with the non-contacting signaling component and with the wireless communications component, the control system component using the non-contacting signaling system to verify whether the movable system is proximate the particular stationary system and using the wireless communications component to receive control information from a second control system component associated with the particular stationary system while the movable system is proximate the particular stationary system;
    at least one positioning actuator operated by the control system component according to the control information received from the particular stationary system to control a location of a workpiece transported by the movable system; and
    wherein the moveable system is a robotic moving platform.

12. The movable system of claim 11, wherein the non-contacting signaling component comprises a receiver operative to receive the signal from the signal path while the movable system is proximate the particular stationary system.

13. The movable system of claim 11, wherein the signal is an optical signal.

14. The movable system of claim 11, wherein the signal is modulated.

15. The movable system of claim 11, wherein the control system component is operative to receive an identifier from the particular stationary system by wireless communications while the movable system is proximate the particular stationary system.

16. The movable system of claim 11, wherein the control system component is operative to provide a previously assigned identifier to the particular stationary system by wireless communications while the particular movable system is proximate the stationary system.

17. In an automated system having at least one stationary system with a first control system component and at least one movable system having a second control system component and a positioning actuator, a method for controlling at least one operation of the movable system while proximate the stationary system, the method comprising:
    determining whether the movable system is currently proximate the stationary system using non-contacting signaling apparatus on the stationary and movable systems;
    transferring control information between the first control system component of the stationary system and the second control system component of the movable system by wireless communications while the movable system is determined to be proximate the stationary system;
    controlling the positioning actuator of the movable system to control a location of a workpiece transported by the movable system according to the control information transferred between the first control system component of the stationary system and the second control system component of the movable system;
    discontinuing transfer of control information between the control system components of the stationary and movable systems when the movable system is determined to be no longer proximate the stationary system; and
    wherein the moveable system is a robotic moving platform.

18. The method of claim 17, wherein determining whether the movable system is currently proximate the stationary system comprises:
    transmitting an optical signal by a first one of the stationary system and the movable system; and
    determining that the movable system is currently proximate the stationary system if the optical signal is successfully received by a second one of the stationary system and the movable system.

19. The method of claim 17, wherein transferring control information between the stationary and movable systems comprises assigning an identifier to the movable system by wireless communications while the movable system is determined to be proximate the stationary system.

20. The method of claim 17, wherein transferring control information between the stationary and movable systems comprises providing a previously assigned identifier to the stationary system by wireless communications while the movable system is determined to be proximate the stationary system.

21. The control system of claim 1, wherein the control system component associated with the stationary system is one of a control module and an I/O module.

22. The control system of claim 1, wherein the control system component associated with the stationary system uses the wireless communications component to communicate with a control module or an I/O module associated with the particular movable system.

23. The movable system of claim 11, wherein the control system component associated with the movable system is one of a control module and an I/O module.

24. The movable system of claim 11, wherein the control system component associated with the movable system uses the wireless communications component to communicate with a control module or an I/O module associated with the particular stationary system while the movable system is proximate the particular stationary system.

25. The method of claim 17, wherein transferring control information comprises transferring control information between a control module or an I/O module of the stationary system and the second control system component of the movable system by wireless communications while the movable system is determined to be proximate the stationary system.

26. The method of claim 17, wherein transferring control information comprises transferring control information between the first control system component of the stationary system and a control module or an I/O module of the movable system by wireless communications while the movable system is determined to be proximate the stationary system.

27. The control system of claim 1, wherein the control system components associated with the stationary system and the particular movable system form a segmented POINTbus backplane, comprising:
   a first part on the stationary system including the control system component and a master wireless transceiver;
   a second part on the particular movable system including at least one I/O module and a slave wireless transceiver, wherein the at least one I/O module of the second part completes the POINTbus backplane when the associated wireless slave transceiver is wirelessly linked to the wireless master transceiver and when the non-contacting signaling system verifies that the movable system is proximate the stationary system.

28. The control system of claim 27, wherein the non-contacting signaling component associated with the stationary system is operative to transmit or receive an optical signal in a signal path proximate the stationary system to verify whether the movable system is proximate the stationary system.

29. The control system of claim 27, wherein the control system component of the stationary system is operative to assign an identifier to the particular movable system by wireless communications while the particular movable system is proximate the stationary system.

30. The control system of claim 29, wherein the particular movable system is operative to provide a previously assigned identifier to the control system component by wireless communications while the particular movable system is proximate the stationary system.

31. The control system of claim 27, wherein the particular movable system is operative to provide an identifier to the control system component by wireless communications while the particular movable system is proximate the stationary system.

32. The control system of claim 27, wherein the first part of the POINTbus backplane can be interrupted and then can reconnect itself with a second part of the particular movable system or a second part of another movable system using Removal and Insertion Under Power (RIUP) functionality.

33. The control system of claim 1, wherein the control system component associated with the stationary system uses the wireless communications component to provide the control information to the second control system component mounted on the particular movable system to control at least one positioning actuator mounted on the particular movable system to control the position of the workpiece transported by the particular movable system while the particular movable system is proximate the stationary system.

34. The movable system of claim 11, wherein the control system associated with the movable system is mounted on the movable system, and wherein the at least one positioning actuator is mounted on the movable system.

35. The method of claim 17, wherein controlling the positioning actuator of the movable system comprises controlling a positioning actuator mounted on the movable system to control the location of the workpiece transported by the movable system according to the control information transferred between the first control system component of the stationary system and the second control system component of the movable system.

* * * * *